United States Patent
Hill

(10) Patent No.: US 7,633,424 B1
(45) Date of Patent: Dec. 15, 2009

(54) WIDE TEMPERATURE RANGE DIELECTRIC ABSORBER

(75) Inventor: Michael D. Hill, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 178 days.

(21) Appl. No.: 11/731,658

(22) Filed: Mar. 30, 2007

Related U.S. Application Data

(60) Provisional application No. 60/811,919, filed on Jun. 8, 2006.

(51) Int. Cl.
*H01Q 17/00* (2006.01)
(52) U.S. Cl. .............................................. 342/2; 342/1
(58) Field of Classification Search ........................ 342/2
See application file for complete search history.

(56) References Cited

U.S. PATENT DOCUMENTS

| | | | | |
|---|---|---|---|---|
| 5,644,838 | A * | 7/1997 | Beratan ........................ | 29/840 |
| 5,743,006 | A * | 4/1998 | Beratan ........................ | 29/840 |
| 5,757,000 | A * | 5/1998 | Rogowski et al. ........... | 250/332 |
| 5,847,390 | A * | 12/1998 | Long et al. ................... | 250/332 |
| 5,949,071 | A * | 9/1999 | Ruffner et al. ............. | 250/338.3 |
| 6,361,825 | B1 * | 3/2002 | Beratan et al. ............. | 427/126.1 |
| 6,802,987 | B1 * | 10/2004 | Udayakumar et al. ..... | 252/62.9 R |
| 6,884,631 | B2 * | 4/2005 | Sawasaki ....................... | 438/3 |
| 6,924,155 | B2 * | 8/2005 | Sawasaki et al. ............... | 438/3 |
| 6,966,998 | B1 * | 11/2005 | Spowart ..................... | 252/582 |
| 2004/0182306 | A1 * | 9/2004 | Butt et al. ........................ | 117/2 |

OTHER PUBLICATIONS

Cheung et al. "Structural and electrical properties of La0.5Sr0.5CoO3 epitaxial films". Appl. Phys. Lett., vol. 62, No. 17, Apr. 26, 1993. pp. 2045-2047.*

Liu et al. "The large magnetoresistance property of La0.5Sr0.5CoO3-x thin films prepared by pulsed laser deposition". Appl. Phys. Lett., vol. 73, No. 8, Aug. 24, 1998. pp. 1047-1049.*

Luo et al. "Electrical and magnetic properties of La0.5Sr0.5CoO3 thin films". Appl. Phys. Lett., vol. 76, No. 14, Apr. 3, 2000. pp. 1908-1910.*

Wang et al. "Infrared optical properties of lanthanum strontium cobalt thin films". 27th International Conference on Infrared and Millimeter Waves. 2002. pp. 173-174.*

* cited by examiner

*Primary Examiner*—Thomas H Tarcza
*Assistant Examiner*—Matthew M Barker

(57) ABSTRACT

According to one exemplary embodiment, a wide temperature range dielectric absorber includes a dielectric absorber comprising a blend of lanthanum oxide, strontium oxide, and cobalt oxide, and is represented by $(1-z)[La_{1-x}Sr_xCoO_{3\pm y}] + z[La_{2-x}Sr_xCoO_{4\pm y}]$. The dielectric absorber includes a first crystalline structure existing independently from a second crystalline structure causing the dielectric absorption composition to have a wide temperature range of electromagnetic radiation absorption. In one embodiment, the first crystalline structure is a perovskite crystalline structure and the second crystalline structure is a potassium nickel fluoride crystalline structure.

16 Claims, 2 Drawing Sheets

WIDE TEMPERATURE RANGE DIELECTRIC ABSORBER

The present application claims the benefit of and priority to a pending provisional patent application entitled "High Temperature Dielectric Absorber," Ser. No. 60/811,919 filed on Jun. 8, 2006. The disclosure in that pending provisional application is hereby incorporated fully by reference into the present application.

BACKGROUND OF THE INVENTION

1. Field of the Invention

The present invention relates to the field of dielectric absorbers. More specifically, the invention relates to dielectric absorbers of electromagnetic radiation.

2. Background Art

In many applications, such as aviation applications, it can be desirable for a structure to be "invisible" to or undetectable. For example, aircraft invisible to electromagnetic radiation is less likely to be spotted on a radar system, which can be desirable in some applications. Conventional approaches have utilized oxide or dielectric absorbent coatings comprising ferromagnetic materials to reduce reflection of electromagnetic waves. However, a ferromagnetic material loses its characteristic ferromagnetic ability at temperatures above the Curie temperature for that material, causing the net magnetization of the ferromagnetic material to be zero.

In applications subjected to a broad temperature range including very high temperatures, such as up to 1100° C., it has proven very difficult to provide a dielectric absorber capable of uniformly absorbing electromagnetic radiation. For example, one conventional method for shielding an aircraft from electromagnetic radiation utilizes a single material dielectric absorber coated on the aircraft. However, many components of an aircraft can reach temperatures in excess of the effective electromagnetic absorption temperature, causing the absorber coating to be ineffective at absorbing electromagnetic radiation at that temperature. Furthermore, in applications subjected to a very broad temperature range, a single material dielectric absorber is ineffective at providing uniform electromagnetic radiation absorption over the entire temperature range.

Thus there is a need in the art for a high temperature dielectric absorber with a wider temperature range of electromagnetic absorption.

SUMMARY OF THE INVENTION

A wide temperature range dielectric absorber, substantially as shown in and/or described in connection with at least one of the figures, and as set forth more completely in the claims.

DETAILED DESCRIPTION OF THE INVENTION

The present invention is directed to a wide temperature range dielectric absorber. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
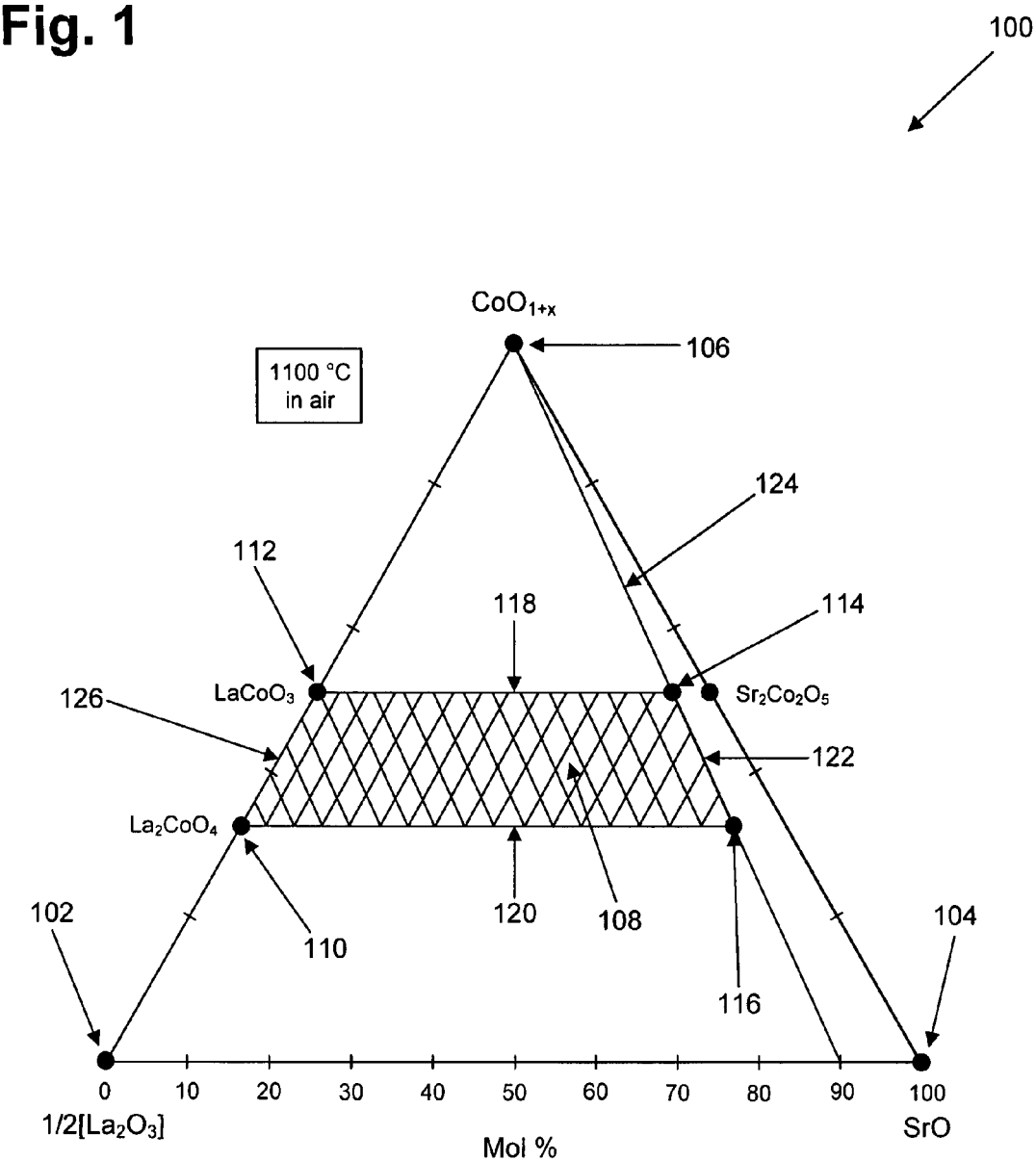
FIG. 1 shows a ternary phase diagram of dielectric absorbers in accordance with one embodiment of the present invention.

FIG. 1 represents ternary phase diagram 100 at 1100° C. in air of a ternary system including a primary component group of lanthanum oxide, strontium oxide, and cobalt oxide, in accordance with one embodiment of the present invention. Ternary phase diagram 100 further includes trapezoidal dielectric region 108, which is bounded by points 110, 112, 114, and 116. In the present embodiment, line 118 extends from point 112 to point 114, line 120 extends from point 110 to point 116, line 122 extends along line 124 from point 114 to point 116, and line 126 extends from point 112 to point 110.

Line 118 represents the upper bound of trapezoidal dielectric region 108, and extends from point 112 to point 114. The chemical formula of the composition along line 118 is $La_{1-x}Sr_xCoO_{3\pm y}$, where "x" can have a value ranging from 0 to 0.9. The value of "x" is one factor in determining the value of "y," which is largely based on the oxidation state of the cobalt. In the present embodiment, the composition along line 118 has the perovskite crystalline structure. The chemical formula of the composition at point 112 is known to be $LaCoO_3$, and does not contain any strontium oxide because it lies on the line between lanthanum oxide vertex 102 and cobalt oxide vertex 106. Moving from point 112 towards point 114 along line 118 changes the chemical composition of the ternary system by increasing the mole percent of strontium oxide in the composition and decreasing the mole percent of lanthanum oxide in the composition. The mole percent of cobalt oxide in the composition remains constant along line 118.

Line 120 represents the lower bound of trapezoidal dielectric region 108, and extends from point 110 to point 116. The chemical formula of the composition along line 120 is $La_{2-x}Sr_xCoO_{4\pm y}$, where "x" can have a value ranging from 0 to 0.9. The value of "x" is one factor in determining the value of "y," which is largely based on the oxidation state of the cobalt. In the present embodiment, the composition along line 120 has the potassium nickel fluoride crystalline structure. The chemical formula of the composition at point 110 is known to be $La_2CoO_4$, and does not contain any strontium oxide because it lies on the line between lanthanum oxide vertex 102 and cobalt oxide vertex 106. Moving from point 110 towards point 116 along line 120 changes the chemical composition of the ternary system by increasing the mole percent of strontium oxide in the composition and decreasing the mole percent of lanthanum oxide in the composition. The mole percent of cobalt oxide in the composition remains constant along line 120.

Line 122 represents the right-hand bound of trapezoidal dielectric region 108, and extends from point 114 to point 116 along line 124. Line 124 is created by drawing a line from the cobalt oxide vertex 106 through the 90 mole percent marker on the line between lanthanum oxide vertex 102 and strontium oxide vertex 104. Line 124 intersects line 118 at point 114, and intersects line 120 at point 116.

Line 126 represents the left-hand bound of trapezoidal dielectric region 108, and extends from point 112 to point 110 along the line between lanthanum oxide vertex 102 and cobalt oxide vertex 106. Line 126 intersects line 118 at point 112, and intersects line 120 at point 110. The composition represented by line 126 contains only lanthanum oxide and cobalt oxide.

In the present embodiment, any point within the portion of trapezoidal dielectric region 108 that is below line 118 and above line 120 represents a composition that includes either the perovskite crystalline structure or the potassium nickel fluoride crystalline structure, or both. The chemistry of the composition represented by trapezoidal dielectric region 108 is unique in that two independent phases (i.e., the perovskite crystalline structure and the potassium nickel fluoride crystalline structure) co-exist together in a single composition. The mole percent of the individual oxides (i.e., lanthanum oxide, strontium oxide, and cobalt oxide) in the composition depends on the specific location selected within trapezoidal dielectric region 108. For example, the mole percent of cobalt oxide in the composition increases towards line 118 and decreases towards line 120. Similarly, moving from line 126 towards line 122 increases the mole percent of strontium oxide in the composition and decreases the mole percent of lanthanum oxide in the composition. The formula $(1-z)[La_{1-x}Sr_xCoO_{3\pm y}]+z[La_{2-x}Sr_xCoO_{4\pm y}]$ represents the chemical composition of any point within trapezoidal dielectric region 108. In this formula, "x" can have a value ranging from 0 to 0.9, and "z" can have a value ranging from 0 to 1. The value of "x" is one factor in determining the value of "y," which is largely based on the oxidation state of the cobalt.

In the embodiment of the present invention in FIG. 1, ternary phase diagram 100 represents a composition of lanthanum oxide, strontium oxide, and cobalt oxide. The portion of ternary phase diagram 100 found within trapezoidal dielectric region 108 represents a stable composition of these oxides and forms either the perovskite or the potassium nickel fluoride crystalline structure, or both. Each individual phase contains two different valence states of cobalt allowing for different absorption mechanisms. In addition, by combining these chemically compatible materials that have different temperature-dependent properties for absorption of light or other electromagnetic waves, such as those generated and used in the radar technology, the embodiment of the invention in FIG. 1 advantageously creates a two-phase oxide dielectric absorber (i.e. a two-phase oxide material or coating) with a flatter curve for absorption of electromagnetic waves or light over a wider range of temperatures. This is called a two-phase oxide dielectric absorber because two atomic arrangements exist in the composition (i.e., both the perovskite and potassium nickel fluoride crystalline structures). Because the two arrangements are chemically compatible throughout the entire temperature range (i.e. up to 1100° C.), they are able to co-exist together and do not react to form a third phase.

Figure 2:
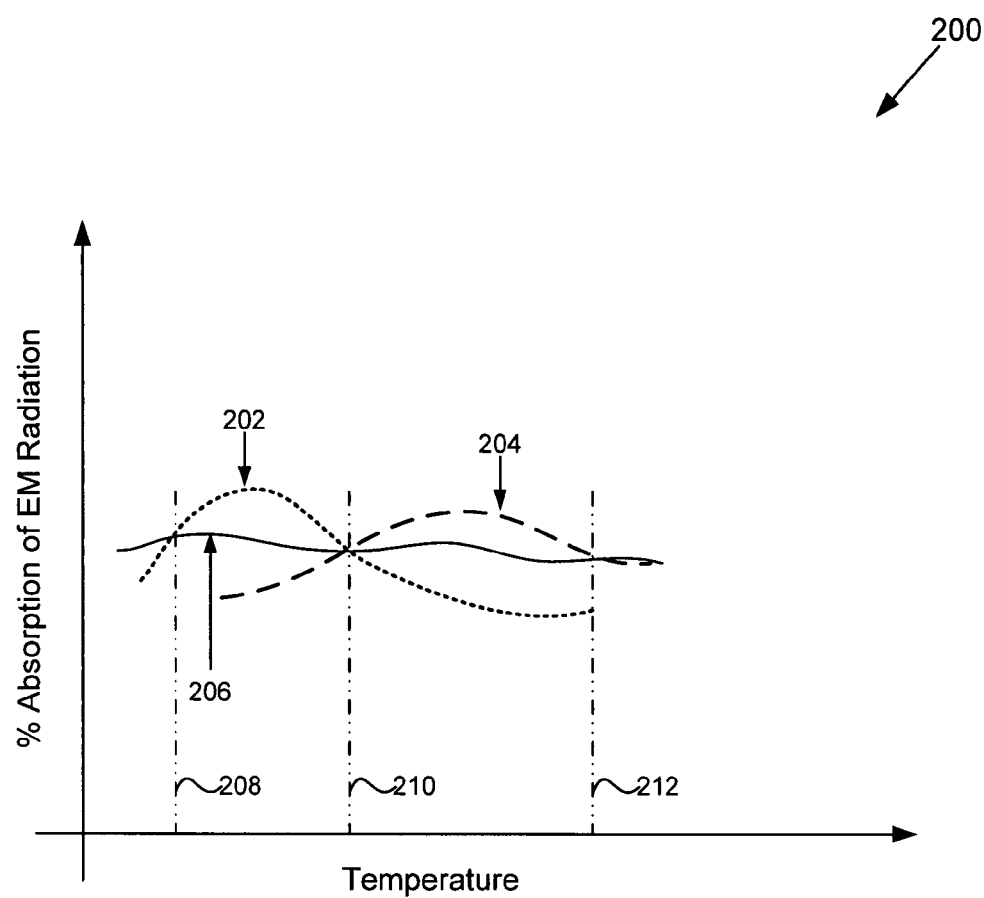
FIG. 2 is a plot displaying the absorption characteristics of dielectric absorbers in accordance with one embodiment of the present invention.

FIG. 2 shows plot 200 displaying the absorption characteristics of dielectric absorbers, in accordance with one embodiment of the present invention. Plot 200 displays the percentage of absorption of electromagnetic radiation as temperature increases for single-phase dielectric absorption material 202, single-phase dielectric absorption material 204, and two-phase dielectric absorption material 206.

As shown in FIG. 2, single-phase dielectric absorption material 202 absorbs a high percentage of electromagnetic radiation from temperature 208 to temperature 210. For example, single-phase dielectric absorption material 202 might effectively absorb electromagnetic radiation from 700° C. to 900° C. As shown in FIG. 2, once the temperature increases beyond temperature 210, single-phase dielectric absorption material 202 does not effectively absorb electromagnetic radiation, as the absorption curve tapers off. Similarly, single-phase dielectric absorption material 204 displays a high percentage of electromagnetic absorption from temperature 210 to temperature 212. For example, single-phase dielectric absorption material 204 might effectively absorb electromagnetic radiation from 900° C. to 1100° C. As shown in FIG. 2, once the temperature increases beyond temperature 212, single-phase dielectric absorption material 204 does not effectively absorb electromagnetic radiation, as the absorption curve tapers off.

An embodiment of the present invention, as shown in FIG. 2, effectively combines two single-phase dielectric absorption materials, such as single-phase dielectric absorption materials 202 and 204, to form two-phase dielectric absorption material 206 with a very broad temperature range of absorption. For example, by combining single-phase dielectric absorption materials 202 and 204 to form two-phase dielectric absorption material 206, the temperature range of absorption can be expanded to 700° C. to 1100° C. Since two-phase dielectric absorption material 206 provides uniform absorption of electromagnetic radiation across a broader temperature range, the present invention advantageously provides for more effective electromagnetic absorption in high temperature applications. Two-phase dielectric absorption material 206 includes both the perovskite crystalline structure and the potassium nickel fluoride crystalline structure, so two atomic arrangements exist in two-phase dielectric absorption material 206. Because the two arrangements are chemically compatible throughout the entire temperature range (i.e. up to 1100° C.), they are able to co-exist together and do not react to form a third phase.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, wide temperature range dielectric absorber has been described.

The invention claimed is:

1. A dielectric absorber comprising:
a primary component group having a first crystalline structure and a second crystalline structure, and comprising lanthanum oxide, strontium oxide, and cobalt oxide, wherein one of said first crystalline structure and said second crystalline structure is a potassium nickel fluoride crystalline structure;
wherein said first crystalline structure exists independently from said second crystalline structure such that said dielectric absorber substantially uniformly absorbs electromagnetic radiation over a wide temperature range.

2. The dielectric absorber of claim 1 wherein said primary component group is represented by $(1-z)[La_{1-x}Sr_xCoO_{3\pm y}]+z[La_{2-x}Sr_xCoO_{4\pm y}]$.

3. The dielectric absorber of claim 2 wherein x is greater than 0.0 and less than or equal to 0.9.

4. The dielectric absorber of claim 2 wherein z is greater than or equal to 0.0 and less than or equal to 1.0.

5. The dielectric absorber of claim 1 wherein said wide temperature range is between approximately 700° C. and approximately 1100° C.

6. The dielectric absorber of claim 1 wherein said first crystalline structure is a perovskite crystalline structure and said second crystalline structure is a potassium nickel fluoride crystalline structure.

7. The dielectric absorber of claim 1 wherein said primary component group is represented by $[La_{1-x}Sr_xCoO_{3\pm y}]$, wherein cobalt exhibits two or more oxidation states.

8. The dielectric absorber of claim 1 wherein said primary component group is represented by $[La_{2-x}Sr_xCoO_{4\pm y}]$, wherein cobalt exhibits two or more oxidation states.

9. A dielectric absorber comprising:
a primary component group having a first crystalline structure and a second crystalline structure, and comprising lanthanum oxide, strontium oxide, and cobalt oxide, wherein one of said first crystalline structure and said second crystalline structure is a potassium nickel fluoride crystalline structure;
wherein said first crystalline structure exists independently from said second crystalline structure such that said first crystalline structure absorbs electromagnetic radiation over a first temperature range and said second crystalline structure absorbs electromagnetic radiation over a second temperature range.

10. The dielectric absorber of claim 9 wherein said primary component group is represented by $(1-z)[La_{1-x}Sr_xCoO_{3\pm y}]+z[La_{2-x}Sr_xCoO_{4\pm y}]$.

11. The dielectric absorber of claim 10 wherein x is greater than 0.0 and less than or equal to 0.9.

12. The dielectric absorber of claim 10 wherein z is greater than or equal to 0.0 and less than or equal to 1.0.

13. The dielectric absorber of claim 9 wherein said first crystalline structure is perovskite crystalline structure and said second crystalline structure is a potassium nickel fluoride crystalline structure.

14. A method for widening a temperature range of electromagnetic absorption by a dielectric absorber, said method comprising:
mixing lanthanum oxide, strontium oxide, and cobalt oxide to form a primary component group, said primary component group being represented by $(1-z)[La_{1-x}Sr_xCoO_{3\pm y}]+z[La_{2-x}Sr_xCoO_{4\pm y}]$;
said dielectric absorber having a first crystalline structure existing independently from a second crystalline structure, wherein said first crystalline structure is a perovskite crystalline structure, and said second crystalline structure is a potassium nickel fluoride crystalline structure.

15. The method of claim 14, wherein x is greater than 0.0 and less than or equal to 0.9.

16. The method of claim 14 wherein z is greater than or equal to 0.0 and less than or equal to 1.0.

* * * * *